June 9, 1959 L. R. BAXTER ET AL 2,889,854
APPARATUS FOR MANUFACTURING FABRICATED PANELS
Filed Feb. 24, 1958 2 Sheets-Sheet 1

INVENTORS
Leonard R. Baxter
Donald E. Rittenberg
BY
Ramsey and Kolisch
Attys.

June 9, 1959
L. R. BAXTER ET AL
2,889,854
APPARATUS FOR MANUFACTURING FABRICATED PANELS
Filed Feb. 24, 1958
2 Sheets-Sheet 2
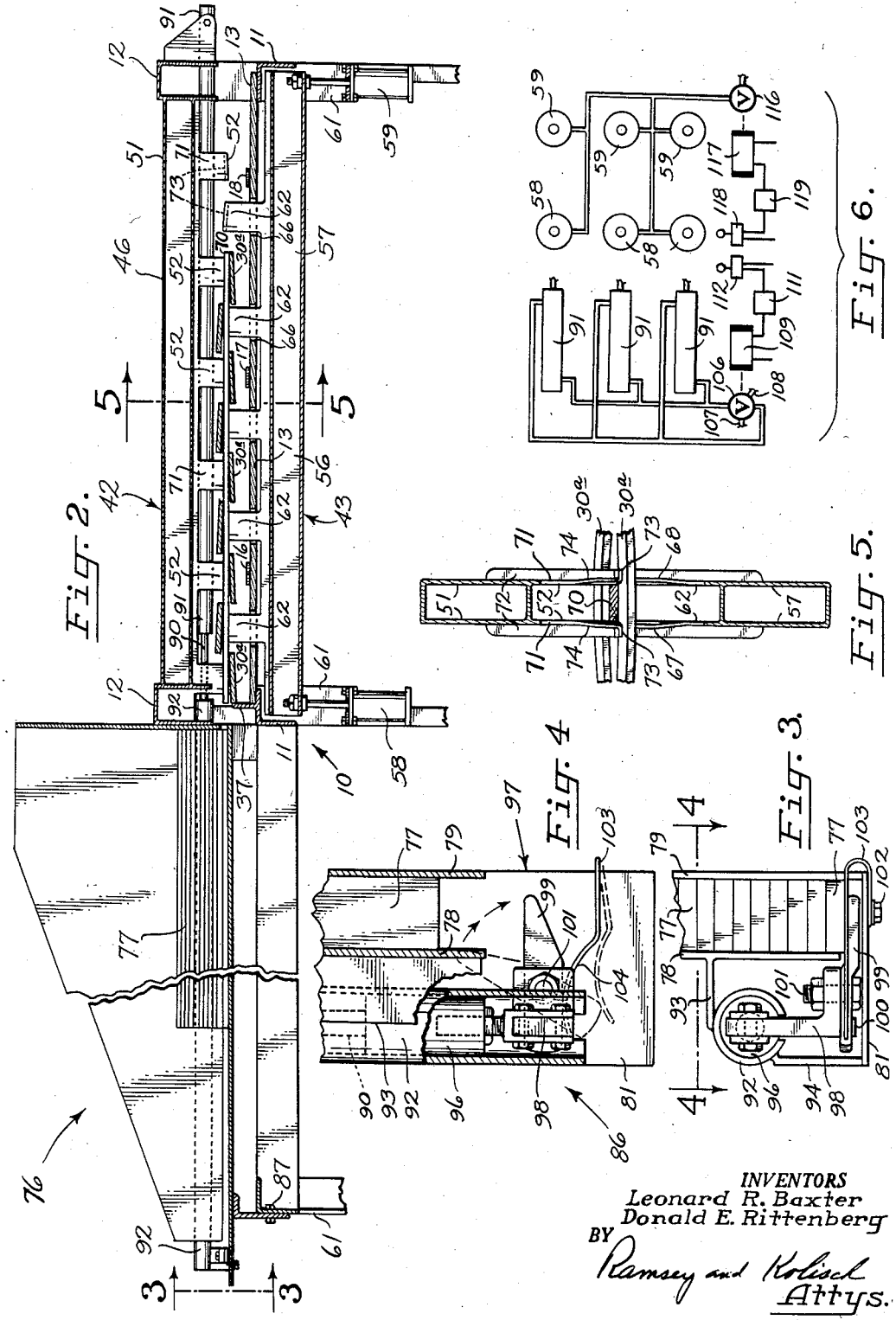
INVENTORS
Leonard R. Baxter
Donald E. Rittenberg
BY
Ramsey and Kolisch
Attys.

United States Patent Office 2,889,854
Patented June 9, 1959

2,889,854

APPARATUS FOR MANUFACTURING FABRICATED PANELS

Leonard R. Baxter and Donald E. Rittenberg, Portland, Oreg.

Application February 24, 1958, Serial No. 717,045

8 Claims. (Cl. 139—28)

This invention relates to apparatus for manufacturing fabricated panels from a series of strip portions arranged side by side, and elongated cross strip inserts. More particularly, the invention has to do with the manufacture of fabricated panels from a base panel cut along one dimension with cuts terminating short of the edges so that the panel is made up of a series of strip portions joined at their ends by an imperforate panel margin. The fabricated panels have particular utility in the manufacture of enclosures, such as in the manufacture of fences, gates, outside tool houses and the like.

Generally, it is an object of this invention to provide novel mechanism for stressing or bending the panel strip portions along a line extending transversely of their length so as to separate the strip portions and prepare a passage for the reception of one or more cross strip inserts.

Another general feature and object of the invention is to provide novel apparatus for manufacturing a fabricated panel from panel strips extending in one direction and cross strip inserts inserted in interwoven fashion between the panel strips which in one continuous operation first bends the panel strips for the reception of the cross strip inserts, and then feeds the inserts into place, the mechanism then releasing the panel strips preparatory to the manufacture of a subsequent panel.

A very pleasing and attractive, as well as sturdy and long-lasting enclosure may be prepared by cutting a plywood panel with a series of elongated, narrow cuts arranged side by side in the plywood panel to produce elongated strip portions in the panel. The cuts are terminated short of the edges of the panel so that an imperforate margin is left at the edges which keeps the strip portions in place. A panel so prepared may then have cross strip inserts threaded endwise through the cuts so that the inserts are exposed alternately first on one side and then on the other side of the panel, in other words, to produce a woven effect. This invention contemplates mechanism which rapidly and accurately stresses or bends the panel strip portions and then feeds the cross strip inserts endwise the required distance between the strip portions thereby to produce a completely fabricated panel.

In general terms, the apparatus of this invention comprises a pair of press means mounted in a frame on opposite sides of a treating bed provided in the frame. The opposed press means when actuated engage in concert opposite sides or faces of a panel, and are conformed so that when the press means move toward each other, the panel strips are each flexed to assume a serpentine shape. Adjacent strips are curved in opposite directions along a line extending transversely of their length, so that when viewed transversely of their length, a passage is formed which opens up, first on one side and then on the other side of the panel, progressing from one strip portion to the next. The apparatus includes injection mechanism which feeds a cross strip insert into this passage while the strip portions are appropriately flexed.

More specifically, each of the press means includes a plurality of pressure mechanisms arranged in face-to-face arrangement. Each pressure mechanism of one press means has a counterpart or complementing pressure mechanism in the other press means disposed oppositely thereof on the opposite side of the treating bed. Each pressure mechanism is made up of a plural number of contact means arranged in a row along one side of the bed. The contact means of a pressure mechanism are staggered with respect to the contact means of its counterpart pressure mechanism, so that when two complementing pressure mechanisms are moved toward each other, the contact means of one are advanced intermediate the contact means of the other, and the contact means dovetail with each other. By such a construction, when a panel is placed on the treating bed with succeeding strip portions of the panel lying adjacent first the contact means of one pressure mechanism and then adjacent the contact means of its counterpart, closing of the pressure mechanisms serves to flex the strip portion of the panel in opposite directions.

To assist in the positioning of an insert in the panel, each of the contact means is provided with a pair of opposed finger portions which define thereinbetween an insert cavity. The insert cavities of the contact means of each pressure mechanism define an elongated insert passage. When complementing pressure mechanisms are moved relatively toward each other, the insert passages of the two mechanisms move into alignment to define a common insert channel. A cross strip insert may then be positioned within this insert channel with the opposed finger portions acting as guides directing the insert accurately along a path between the panel strips.

The apparatus of this invention is also characterized by novel injection mechanism for the cross strip inserts which includes guide structures mounted in the frame to one side of the treating bed and defining an elongated guideway aligned with and forming an extension of the insert channel mentioned above. The injection mechanism includes a packer for moving inserts one at a time down the guideway and into the insert channel in the manufacture of a completed panel.

Another object and feature of the invention is to provide such apparatus wherein the flexing of the strip portions of a panel is produced by lifting the panel away from the conveyor mechanism moving the panel onto the treating bed. This enables the use of continuous belts for transporting a panel onto the treating bed. Wear on the belts is kept at a minimum since the flexing pressure is applied to the strip portions when the panel is displaced from and out of contact with the belts. Thus, in a preferred embodiment, one of the press means is fixedly mounted above the treating bed, and the other of the press means is mounted below the treating bed and movable up past the treating bed when actuated to deform the strips. On operation of the device, the lower press means moves upwardly, picks up a panel, and on continued movement, flexes the strip portions of the panel.

Other objects and features of the invention include novel control mechanism wherein the action of the injection mechanism is coordinated with movement of a panel between the upper and lower press mechanisms. Further, a unique packer means is included in the injection mechanism which automatically picks up one insert at a time and then moves it into place, and the opposed fingers of each contact means are so formed on their bottom and side edges as to create a funneling action when an insert is moved into place whereby the insert is prevented from hanging up in the apparatus and is assured of correct positioning in the panel.

Other objects, novel features, and advantages are attained by this invention, which is described hereinbelow in conjunction with the accompanying drawings wherein:

Fig. 2 is a section view along the line 2—2 in Fig. 1, showing details of the injection mechanism and the upper and lower pressure mechanisms employed in the invention, the latter being in the position they occupy during the deformation of a panel and after the insertion of a cross strip insert;

Fig. 3 is an enlarged end view taken in the direction of line 3—3 in Fig. 2, showing details of the end of the ejection mechanism;

Fig. 4 is a section view along the line 4—4 in Fig. 3;

Fig. 5 is a section view, slightly enlarged, along the line 5—5 in Fig. 2, illustrating the opposed fingers of a contact means; and Fig. 6 is a schematic showing of a control circuit used in the invention.

Figure 1:
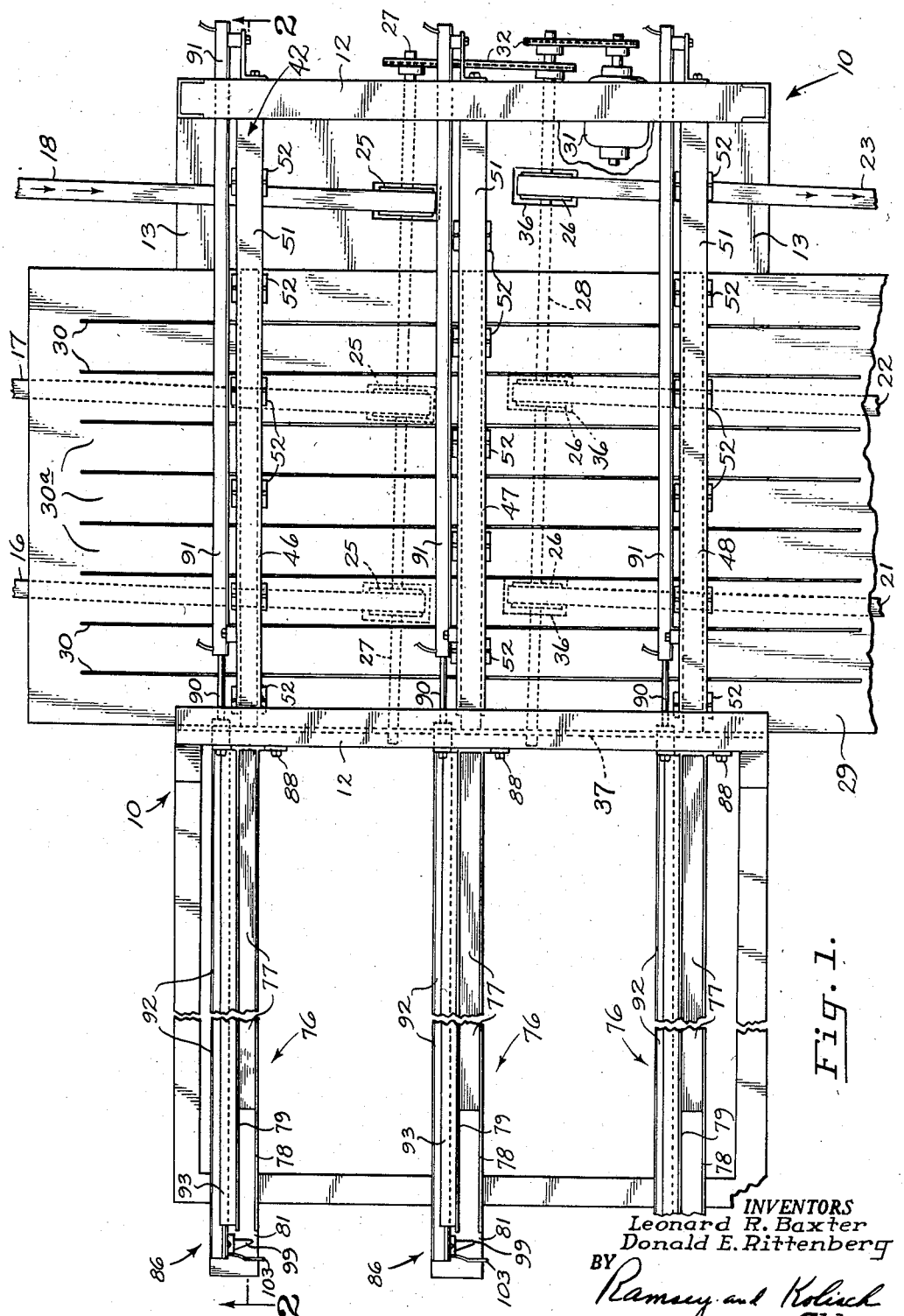
Fig. 1 is a top view of panel fabricating apparatus constructed according to an embodiment of this invention.

Referring now to the drawings for a description of the invention, and in particular to Figs. 1 and 2, the apparatus includes a frame 10 comprising frame members such as longitudinal members 11 and 12, and a table surface 13.

Moving over table surface 13 and providing a treating plane or bed for a panel deposited thereon are a series of belts, such as infeed belts 16, 17, and 18 and outfeed belts 21, 22, and 23. The top runs of the belts slide over table surface 13. These belts are reeved at opposite ends about suitable support pulleys, exemplified by pulleys 25 for the infeed belts and pulleys 26 for the outfeed belts. Pulleys 25 at the forward end of the infeed belts are mounted on a pulley shaft 27, and pulleys 26 at the rear end of the outfeed belts are mounted on a pulley shaft 28. Cutouts 36 are provided in the table surface and these accommodate the pulleys supporting the ends of the belts. Shaft 27 and 28 are rotatably supported at their ends in a pair of laterally opposed frame members 11. The belts are power driven, and are operable to transport a panel, such as panel 29 over table 13 when such a panel is placed on the table. In the embodiment illustrated, the infeed and outfeed belts are driven by a motor 31, and chains 32 operatively connecting the motor and the pulley shafts. The belts are moved by the motors so that their top runs move downwardly in Fig. 1, and the belts are operable to transport a panel in a downward direction in Fig. 1.

Panel 29, prior to being fed to the apparatus, may be cut with a series of elongated parallel saw kerfs 30 which terminate short of the ends of the panel to leave parallel strip portions 30a joined at their ends by an imperforate margin. Such a panel has been found to be well suited for the manufacture of a fabricated panel, as the imperforate margin keeps the panel strip portions aligned, and on flexing of the strip portions and the insertion of cross strip inserts, a prestressed condition is set up in the panel which contributes rigidity and strength thereto. While a particular type of panel is illustrated in connection with the operation of the apparatus of the invention, it should be obvious that other types of panel strips could be employed other than the type specifically shown.

Along one side of table surface 13 and joined to a frame member 11 at the left-hand side of the apparatus in Fig. 2 is an upstanding flange 37 which extends longitudinally of table 13. This flange serves as an edge guide and defines one edge of the treating bed in the apparatus. The pulley shafts are mounted in the frame so that they are obliquely disposed with respect to the longitudinal dimension of flange 37. Thus the conveyor belts travel over the top of table surface 13 so they tend to converge against flange 37. This provides a means for properly seating panel 29 against flange 37 when it is fed into the apparatus.

Mounted in frame 10 above and below the treating bed are an upper and a lower press means, indicated generally at 42 and 43, respectively. These together constitute the deforming means of the apparatus.

The upper press means 42 comprises, in the embodiment shown, three pressure mechanisms 46, 47, and 48 extending transversely of the path of a panel as it slides through the apparatus along flange 37. As can be seen with reference to pressure mechanism 46, each pressure mechanism includes a rigid transverse brace member 51 affixed at its ends to longitudinal frame members 12, and a series of contact means 52 depending downwardly and rigidly joined to the brace member.

The lower press means comprises three lower pressure mechanisms, exemplified by pressure mechanism 56 in Fig. 2, each of which is aligned with but underneath a complementary or counterpart pressure mechanism of the upper press means.

Referring to Fig. 2, each of the lower pressure mechanisms comprises a brace member 57 (which constitutes a subframe) mounted in the frame intermediate laterally offset longitudinal frame members 11. Brace member 57, instead of being fixed in the frame, is free to reciprocate vertically up and down in the frame. The ends of the brace member for each lower pressure mechanism are powered up and down by a pair of piston-cylinders or motors 58, 59 each of which is mounted in a depending support leg 61 integral with frame 10. The rod portions of the piston-cylinders are connected to the ends of member 57. Like each of the upper pressure mechanisms, each of the lower pressure mechanisms also includes a series of contact means indicated at 62.

From the above it will be noted that each of the press means is comprised of plural pressure mechanisms, and each of the pressure mechanisms is comprised of plural contact means arranged in a row. Also, each of the upper pressure mechanisms has an opposed lower pressure mechanism complementing it and aligned therewith. It will be seen with reference to Fig. 2 that in any pair of complementing pressure mechanisms, the contact means of one are staggered with respect to the contact means of the other. When a lower pressure mechanism is raised during a pressing cycle, to the condition shown in Fig. 2, the contact means of the lower pressure mechanism are advanced through cutouts 66 provided in table surface 13 and up past the treating bed until they lie intermediate the contact means of the counterpart upper pressure mechanism (in Fig. 2, the contacting ends of a majority of the contact means 62 and 52 are obscured by an insert 77). When released after advancing upwardly, the contact means of the lower pressure mechanisms return so that their upper surfaces are substantially aligned with table surface 13. Since the contact means of a pair of complementing pressure mechanisms are staggered with respect to each other, succeeding strip portions 30a of a panel are engaged when the lower press means is raised during a press cycle first by the contact means of one pressure mechanism, and then by the contact means of the other pressure mechanism.

It will also be noted with reference to Fig. 1, considering any pair of adjacent pressure mechanisms in the upper press means, that the contact means of the adjacent two pressure mechanisms are not aligned with each other, but instead are staggered, so that the upper faces of succeeding strips 30a in the panel are engaged during a press cycle by the contact means of alternate pressure mechanisms. The same holds true for the contact means of adjacent pressure mechanisms in the lower press means, since, as noted above, the contact means of complementing pressure mechanisms are staggered. As a result, when the lower press means is advanced upwardly so that the contact means of cooperating pressure mechanisms are advanced intermediate each other, the strips 30a of the panel are bent in opposite directions viewing transversely of the panel along the plane occupied by complementing pressure mechanisms. Further, any given strip in the panel is bent first either upwardly or downwardly, and then in the other direction, as the strip extends from one pair of complementing pressure mechanisms to the next.

With reference now in particular to Fig. 5, each of the contact means of the lower and of the upper pressure mechanisms has a pair of opposed finger portions, indicated at 67 and 68, which extend in the direction of the treating bed defined by the conveyor belts. The opposed finger portions of each contact means define therebetween an insert cavity. The insert cavities of the contact means of each pressure mechanism are aligned with each other so as to define an elongated insert passage which extends transversely of the strip portions of the panel. Movement of the lower press means upwardly during a press cycle causes the contact means of the lower press means to move up past the conveyor belts so that the insert passages of complementing pressure mechanisms move into alignment to define a common insert channel. Thus in Figs. 2 and 5 the contact means of opposed pressure mechanisms are shown advanced together and defining a channel occupied by a cross strip insert 70.

Each of the fingers of a contact means is made up of a plate portion 71 rigidly affixed to the brace member carrying the same, strengthened by a gusset 72. The terminal ends of plates 71 for each contact means have turned over heel portions 73 which provide abutment shoulders for pressing against a strip when the upper and lower press means are moved together. Referring to Fig. 2, the turned over heel portions are turned over along creases which are not truly horizontal, but which are slightly inclined from a horizontal, so that the strip portions engaged by the lower press means are bent with their left-hand edges in Fig. 2 higher than their right-hand edges, and so that the strip portions engaged by the upper press means are bent with their left-hand edges lower than their right-hand edges. Thus, when the upper and lower press means are moved together as in Fig. 2, the strip portions are not only pushed away from each other, but also are twisted so that their surfaces slope toward each other so that they may act as a funneling means for inserts positioned between the strip portions.

It will also be noted, with reference to Fig. 5, that the edges of plates 71 facing the left in Fig. 2 are provided with turned lips 74. The lips of the two opposed finger portions function to direct an insert centrally between opposed fingers and prevent an insert from hanging up on the fingers should it become slightly skewed.

As can be seen in Figs. 1 and 2, to the left of each complementing set of pressure mechanisms is guide structure generally indicated at 76 for holding and guiding a stack of cross strip inserts 77. Each guide structure is comprised of opposed side walls 78, 79, a bottom wall 81 and a front wall which terminates just short of the bottom wall to define a feed slot for a single insert. (The size of the feed slot would vary depending upon the size and cross section of the insert used.) Each bottom wall 81 is aligned with the insert channel defined by a complementing set of pressure mechanisms when the pressure mechanisms are advanced toward each other. The bottom wall and side walls thus constitute a guideway aligned with and forming an extension of the insert channel.

Cross strip inserts in stack 77 are piled in the guide structure and are moved one at a time into the insert channel by operation of an injection mechanism 86 to be described. The guide structure is fixed in adjusted vertical position at its left-hand end in Fig. 2 by nut and bolt assemblies 87. The right-hand end of each guide structure is secured in adjusted position by nut and bolt assemblies 88 (see Fig. 1).

Referring now to Figs. 1, 2, 3, and 4, each of the injection mechanisms 86 includes a double acting piston-cylinder 91 secured to the frame and extending transversely across the frame above table surface 13. Aligned with and to the left of each piston-cylinder is a guide tube 92 which serves as a guide for the free end of the piston rod 90 for each piston-cylinder. Each guide tube is welded in place as by welding the tube to longitudinal strip 93 along its top side, and bottom portions of the tube to flange 94 (see Fig. 3).

The outer end of each piston rod 90 has affixed thereto a cylindrical part 96 which centers the end in guide tube 92 during reciprocal movement of the rod. Outwardly of part 96 is a packer mechanism 97.

Referring to Figs. 3 and 4, packer mechanism 97 includes an L-shaped part 98 affixed to the outer end of rod 90, and a pivotable kicker member 99. The kicker member pivots about a pivot pin 101, between a position at right angles to part 96 and rod 90 determined by the forward edge of the kicker striking pin 100, and an angular position indicated by dotted lines in Fig. 4. Wall 79 of guide structure 76 terminates short of bottom wall 81 along its length, thereby providing a passage for the kicker member downwardly through the guide structure when the kicker member is moved by actuation of piston-cylinder 91.

Affixed as by screw 102 to the base of bottom wall 81 is a spring 103. Spring 103 has a free end which is disposed above the bottom wall adjacent the rear edge of the kicker member when the kicker member is positioned outwardly from table 13. Movement of the kicker member to its outmost position from table surface 13 moves the kicker member against the spring so that the spring abuts the rear edge of the kicker member and moves the kicker member to a perpendicular position relative to rod 90 shown in Fig. 4 in solid lines. In a perpendicular position, the kicker member is in position to pack an insert. The kicker member pivots to enable return of the kicker member without displacing an insert.

In operation, a panel is first moved onto table surface 13 by belts 16, 17, 18 and 21, 22, 23. When positioned properly, the lower press means is actuated so that it moves upwardly to deform the panel strip portions. When moved upwardly, the panel is lifted clear of the conveyor belts.

Piston-cylinders 91 are then actuated to contract the piston-cylinder. This causes the kicker member associated with each to move downwardly in a guideway with the outer end of the kicker member engaging the lower insert of the stack of inserts carried in each guide structure. Movement of each kicker member continues until the stroke of the piston-cylinder attached to the kicker member is completed. In this manner a cross strip insert is packed into the insert channel produced between the panel strip portions by operation of the press mechanisms. Each kicker member is then returned preparatory to grabbing another insert.

The lower press means is then moved downwardly to release the panel. Upon release, the strip portions of the panel, because of their natural resiliency, move together and tightly grab the inserts woven between the strip portions. When the lower press means is retracted, the panel is dropped onto the conveyor belts and moved off the frame of the apparatus. This clears the table for the production of another fabricated panel.

A control mechanism may be used so that the entire operation is performed automatically. A schematic showing of a control circuit is illustrated in Fig. 6. The wiring, switches, and parts of Fig. 6 have been omitted from the other figures for reasons of clarity, however, it should be understood that the elements of Fig. 6 are also a part of the apparatus discussed.

Referring to Fig. 6, piston-cylinder 91 of the injection mechanisms are shown controlled by a conventional valve 106 having inlet and exhaust connections 107, 108. Valve 106 may be adjusted to admit fluid under pressure to either side of piston-cylinders 91, and provide an exhaust for the other side of the piston-cylinders. Valve 106 is ganged to a solenoid 109 controlled by time delay switch 111 and make and break switch 112. Switches 111, 112 are conventional, switch 112 having mechanism closing a circuit between its terminals when its switch finger is actuated, and switch 111 having mechanism which maintains a closed circuit between its terminals for a short time interval after energizing, after which interval the connection between the terminals is broken which condition remains for another short time interval.

Piston-cylinders 58, 59 of the pressure mechanisms in the lower press means are controlled by valve 116 which is conventional and which operates to admit pressure fluid or to exhaust the lower ends of piston-cylinders 58, 59. Solenoid 117 is ganged to valve 116, which is regulated by make and break switch 118 and time delay switch 119. Switches 118 and 119 resemble switches 112, and 111, respectively.

The control mechanism described operates as follows. Switch 118, which constitutes a first signal means, is positioned so as to be actuated when a panel is conveyed by the conveyor belts to a central position over table surface 13. When switch 118 is actuated, solenoid 117 is energized, and valve 116 adjusted to admit pressure fluid to piston-cylinders 58, 59. This causes the lower press means to be raised. The press means remains raised for a time interval determined by the length of time switch 119 remains with a closed connection between its terminals.

Switch 112, which constitutes a second signal means, is actuated by movement of the lower press means to its uppermost raised position. When this occurs, solenoid 109 is energized and valve 106 adjusted so that piston-cylinders 91 are contracted. Switch 111 remains with a closed circuit between its terminals for a relatively short time, just sufficient for piston-cylinders 91 to complete their contraction stroke. When switch 111 opens, valve 106 is adjusted so that piston-cylinders 91 return to an expanded condition. Switch 119 is set so that after a time interval which is long enough to permit contraction and expansion of piston-cylinders 91, the switch opens up to deenergize solenoid 117 and to cause the exhaust of pressure fluid from piston cylinders 58, 59.

This causes the lower press means to retract, enabling a panel to be transported off the table frame by belts 16, 17, 18, 21, 22, 23.

In summary, it will be noted that the apparatus of this invention has a number of novel features which contribute to its practicality and usefulness. By bending adjacent strip portions of a panel simultaneously in opposite directions, a wide gap is produced which readily receives a cross strip insert. The strip portions are twisted by the pressure mechanisms so that their surfaces tend to act as funneling surfaces for an insert injected into the panel. The opposed fingers of each contact means are provided with lips which also assist in directing an insert into place.

A separate set of infeed and outfeed belts are employed, in order that the belts may be mounted without having a belt over a portion of its length overlying a contact means of the lower press means. The lower press means rises during operation of the apparatus, and if a belt extended over a lower contact means, it would impede movement of the contact means and cause excessive wear in the belt.

It is to be understood that the disclosure of three pressure mechanisms 46, 47, and 48 is exemplary only. It is usually preferable that there be plural pressure mechanisms to deflect strip portions of panels as commonly constructed. More complex panels might need more than three pressure mechanisms including a greater number of contact means to promote flexing of the panel strips. In the panels discussed herein, however, three such pressure mechanisms are adequate. Also the drawings disclose longitudinal strips with normally disposed inserts. This apparatus is not limited to such arrangements either with regard to the disposition of the strips or the perpendicular arrangement of the inserts interlaced therewith.

It is claimed and desired to secure by Letters Patent:

1. Apparatus for manufacturing fabricated panels from a pair of strip portions arranged side by side and an elongated cross strip insert comprising a frame, a series of elongated continuous conveyor belts mounted in said frame with their upper surfaces defining a horizontal treating bed, a bottom pressure mechanism mounted in said frame beneath said treating bed and a top pressure mechanism mounted in said frame above said treating bed, said top and bottom pressure mechanisms being aligned with each other and occupying substantially a common vertical plane, one of said pressure mechanisms having a pair of contact means aligned in said vertical plane but offset sidewise one from the other in said plane and the other of said pressure mechanisms having a contacting means aligned in said vertical plane but spaced between said pair of contacting means for said one pressure mechanism and on the other side of said bed, and means for moving said bottom pressure mechanism vertically upwardly above said treating bed whereby the contacting means of said one pressure mechanism is advanced in a vertical direction relative to the other to lie intermediate said pair of contacting means of said other pressure mechanism.

2. In the manufacture of fabricated panels from a series of strip portions arranged side by side, apparatus for deforming the strip portions comprising a frame, a series of elongated continuous conveyor belts mounted in said frame with their upper surfaces defining a horizontal treating bed, top and bottom pressure mechanisms mounted above and below said treating bed, respectively, and aligned substantially with each other in a common vertical plane, each of said pressure mechanisms having plural contact means spaced at intervals and aligned in row across said treating bed on one side of said treating bed, the contact means of one pressure mechanism being staggered with respect to the contact means of the other pressure mechanism, and power actuated means for moving simultaneously the contact means of the bottom pressure mechanism upwardly above said treating bed whereby the contact means of the latter are advanced vertically to lie intermediate the contact means of said top pressure mechanism.

3. The apparatus of claim 2 wherein each contact means has opposed finger portions extending in the direction of said bed and defining thereinbetween an insert cavity, the insert cavities of the contact means of each pressure mechanism being mutually aligned and defining an elongated insert passage, the insert passages of the two pressure mechanisms moving into alignment to define a common insert channel on actuation of said power actuated means.

4. In the manufacture of fabricated panels from a series of strip portions arranged side by side and a cross strip insert, apparatus for deforming the strip portions and injecting the insert comprising a frame, a series of elongated continuous conveyor belts mounted in said frame with their upper surfaces defining a horizontal treating bed, top and bottom pressure mechanisms mounted above and below said treating bed, respectively, and aligned substantially with each other in a common vertical plane, each of said pressure mechanisms having plural contact means spaced at intervals and aligned in row across said treating bed along one side of said treating bed, the contact means of one pressure mechanism being staggered with respect to the contact means of the other pressure mechanism, power actuated means for moving simultaneously the contact means of the bottom pressure mechanism upwardly above said treating bed whereby the contact means of the latter are advanced vertically to lie intermediate the contact means of said top pressure mechanism, each of said contact means having opposed finger portions extending in the direction of said bed and defining thereinbetween an insert cavity, the insert cavities of the contact means of each pressure mechanism being mutually aligned and defining an elongated insert passage, the insert passages of the two pressure mechanisms moving into alignment to define a common insert channel on actuation of said power actuated means, guide means mounted to one side of said frame defining an elongated guideway aligned with and forming an extenison of said insert channel, packer means movable in a path along said guideway for pushing the cross strip insert into said insert channel, and reciprocating motor means actuating said packer means.

5. The apparatus of claim 4 wherein the opposed finger portions of each contact means have lip portions along portions of their edges which face said guide means tending to funnel the end of a cross strip insert into the insert cavity defined between two finger portions.

6. Apparatus for manufacturing fabricated panels from a series of strip portions arranged side by side and a plurality of elongated cross strip inserts comprising a base frame and means defining an elongated treating bed for said series of strip portions, an upper and a lower press means mounted on said base frame on opposite sides, respectively, of said bed, each of said press means having a plural number of elongated pressure mechanisms mounted parallel to one another on said base frame, each of said pressure mechanisms comprising plural contact means spaced at intervals along the length thereof and aligned in a row extending transversely across said treating bed along one side of said bed, each pressure mechanism of said lower press means having a counterpart pressure mechanism in said upper press means disposed oppositely thereof, the contact means of each pressure mechanism of said lower press means being staggered with respect to the contact means of its counterpart pressure mechanism in the upper press means, and means for moving simultaneously the contact means of one of said press means relative to the contact means of the other whereby the contact means of said one press means are advanced intermediate the contact means of the other press means.

7. The apparatus of claim 6 wherein said last-mentioned means comprises a subframe interconnecting and affixed to the contact means of each pressure mechanism of said lower press means mounted for reciprocation in said base frame toward and away from said upper press means, and motors interposed between said subframe and base frame operable on actuation to move said subframe.

8. In apparatus for manufacturing fabricated panels from a series of strip portions arranged side by side and an elongated cross strip insert, a frame and means defining a treating bed thereon, power actuated deforming means operable when activated to engage top and bottom surfaces of said strip portions when positioned on said treating bed and bend adjacent strip portions along a line extending transversely of their length in opposite directions thereby to produce an insert passage extending transversely of said strip portions, injection mechanism to one side of said treating bed having power actuated packer mechanism for injecting said cross strip insert into said insert passage, and control means regulating said deforming means and injection mechanism, said control means comprising a first signal means triggered by movement of said strip portions into said treating bed for activating said deforming means, and a second signal means for activating said packer mechanism, said second signal means being triggered after triggering of said first signal means.

References Cited in the file of this patent

UNITED STATES PATENTS

| | | |
|---|---|---|
| 823,628 | O'Brien | June 19, 1906 |
| 849,422 | O'Brien | Apr. 9, 1907 |
| 881,225 | Carpenter | Mar. 10, 1908 |
| 937,608 | Hull | Oct. 19, 1909 |
| 2,218,758 | Leal | Oct. 22, 1940 |